March 17, 1936.    M. ZEH    2,034,500
INDICATING DEVICE FOR RADIO APPARATUS
Filed Jan. 6, 1933    2 Sheets-Sheet 1
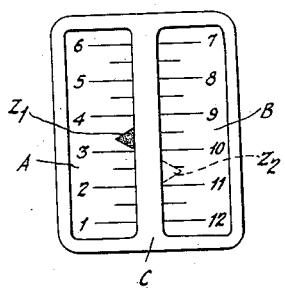
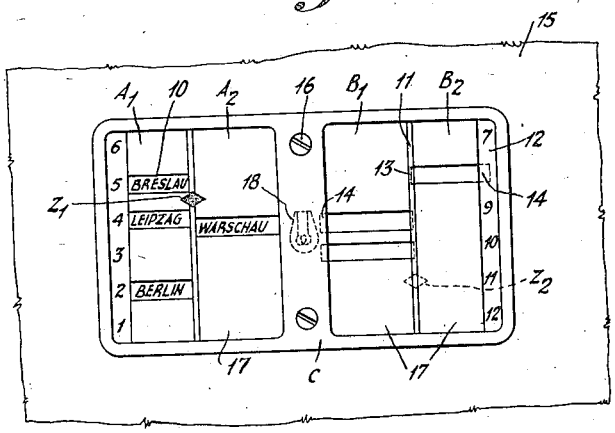
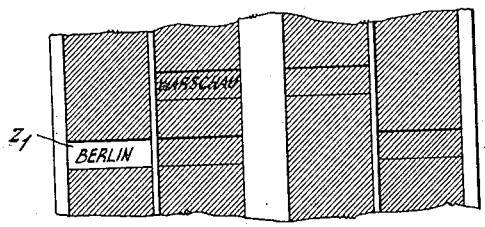
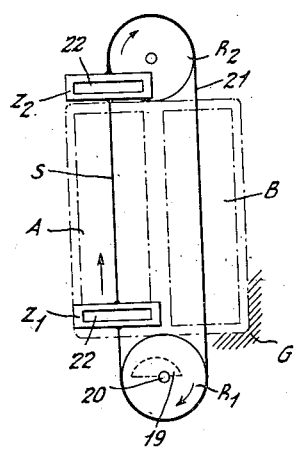
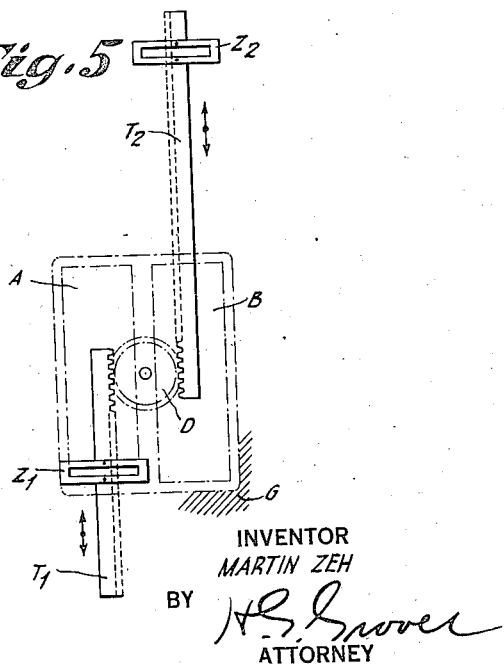
INVENTOR
MARTIN ZEH
BY
ATTORNEY March 17, 1936.    M. ZEH    2,034,500
INDICATING DEVICE FOR RADIO APPARATUS
Filed Jan. 6, 1933    2 Sheets-Sheet 2

INVENTOR
MARTIN ZEH
BY
ATTORNEY

Patented Mar. 17, 1936

2,034,500

UNITED STATES PATENT OFFICE 2,034,500

INDICATING DEVICE FOR RADIO APPARATUS

Martin Zeh, Friedenau, Germany, assignor to Allgemeine Elektricitatz Gesellschaft, Berlin, Germany, a corporation of Germany Application January 6, 1933, Serial No. 650,488
In Germany December 10, 1931

7 Claims. (Cl. 116—124.1)

An object of this invention is to provide a novel form of indicator and actuating means for an adjustable radio device such as a transmitter or a receiver.

A further object is to provide such an indicating means in which the scale is subdivided into two or more sections with the result that the total height or length of scale required to cover a given frequency range or number of stations may be reduced. Other and further objects of the invention will become apparent as the description thereof proceeds.

For radio apparatus it is desirable in order to facilitate setting and finding of the stations to be received, to provide the scale over which the pointer passes that is connected to the setting element of the apparatus, with the names of the stations at such places at which the setting corresponds with the respective stations. In order to make a quick tuning in of the desired station possible, it is suitable to arrange the names of the stations in such manner that all of them are visible whereby the operator recognizes immediately in which direction the tuning device must be moved.

The best use of the space and the most convenient readability can be obtained with a vertical straight scale having the names of the stations arranged above each other. Due to the large number of stations and their uneven distribution the scale assumes a comparatively great length and in most cases therefore the height of the apparatus becomes undesirably great.

In accordance with my invention this disadvantage can be overcome in that the scale is divided into two or several parts arranged adjacent each other and that the indicating device is constructed in such manner that the indicator pointer passes successively along the single parts of the scale. This arrangement also presents the advantage of a considerably improved general view of the stations than is the case in the arrangement in which all stations are exhibited upon one long scale. The invention will be further explained with reference to the accompanying drawings showing several embodiments by way of example.

Figure 6:
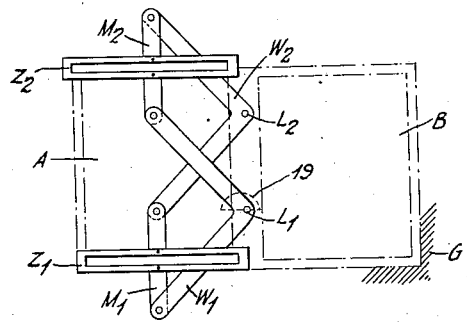
Figure 7:
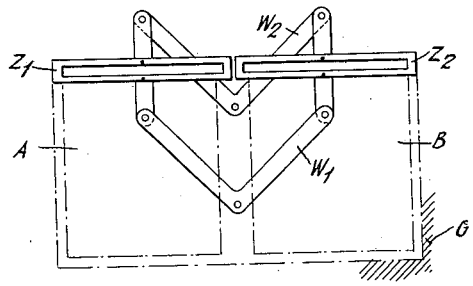
Figure 8:
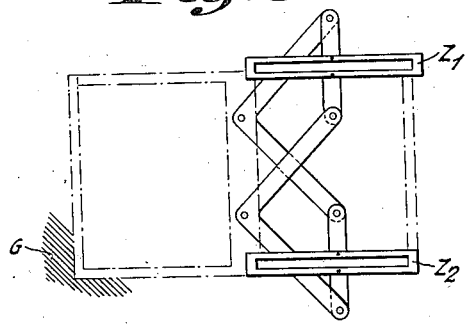
Figure 9:
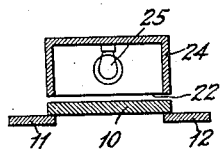

Figure 1 represents a scale subdivided into two parallel portions with a different pointer for each portion, Figure 2 represents a scale in which the station characters are arranged in four rows each two rows having a different pointer, Figure 3 is a front view of a portion of the scale of Figure 2 when illuminated by the indicator shown in Figure 9, Figures 4 and 5 show belt and rack drives respectively for the indicators, Figures 6 to 8 show a parallelogram-drive for the indicators in different positions and, Figure 9 is a horizontal sectional view of the indicator shown in Figures 4 to 8.

Figure 1 represents schematically the division of a scale extending from 1 to 12, into two vertical straight portion A and B arranged parallel and adjacent to each other one of which extending from bottom to top and the other one from top to bottom. When operating the setting device of the apparatus i. e. for instance the turning knob provided for the operation of the tuning element such as a variable condenser, beginning from its initial position, then the indicator or pointer $Z_1$ moves from 1 to 6 and when turning the knob still further, the pointer $Z_1$ disappears and pointer $Z_2$ appears moving from 7 to 12.

It will be understood that the increasing numerals on the scale 1 to 12 indicate increasing frequency (or wave length) of the tuned circuit, so that as the tuning condenser is rotated, at position 1 the frequency may be 200 kilocycles, at numeral 5 the frequency 300 kilocycles, at numeral 9 the frequency 400 kilocycles and at numeral 12 it may be about 500 kilocycles. In other words, part of the frequency range is indicated on the left hand scale A and the remainder thereof on scale B at the right.

As shown in Figure 2 the arrangement may be suitably carried out in such manner that each partial scale is divided into two longitudinal halves $A_1$, $A_2$ and $B_1$, $B_2$ between which the pointers $Z_1$ and $Z_2$ pass. This affords the advantage that the station plates some of which are designated in the drawings as Breslau, Leipzig, Berlin, Warschau, can be conveniently distributed upon the two halves of each partial scale so that also in the case in which the stations are close together the overlapping of the station plates is avoided as would otherwise happen for the stations Leipzig and Warschau as shown in the figure, the wave length of the Warschau station being intermediate between tuning positions 3 and 4 of the scale. The station designators or plates 10 may be formed of inscribable material such as translucent celluloid or paper on which the station names or letters may be written in black or other colored ink. It will be understood that the plates 10 are vertically adjustable and are retained in position by vertical strips 11 and 12 which overlie their ends as indicated at 13 and 14. The entire assemblage may be secured in position on the panel 15 of the radio receiver or other device by means of a metal clamping plate C secured to the panel by any desired means such as the screws 16. Suitable sized openings 17 may be made in panel 15 behind the station plates if desired and a source of light or pilot light 18 mounted behind the panel the light from which will illuminate the station letters from the rear.

In Figures 3 and 9 a particularly suitable pointer is shown in combination with such scale. This pointer is a luminous indicator in the form of a narrow band of light moving across the scale 10 and which has the width approximately corresponding to that of a station plate. To this end two small boxes 24 each provided with a slot 22 may be used, each containing an electric bulb 25. These boxes are moved at the rear of the transparent partial scale whereby the side of the box provided with the slot points towards the scale. Thus the station plate that happens to be above the slot is brightly illuminated, the others being invisible to an observer in a dark room.

In order to cause the pointer to pass the partial scale successively in the above described manner, the pointer or indicator may be operated for instance by the driving devices schematically represented in Figures 4 and 5.

Figure 4 shows a cord transmission for the pointers $Z_1$ and $Z_2$ which may be of ordinary design or be the boxes or luminous pointers above described. The pointers $Z_1$ and $Z_2$ are moved by a belt or cord 21 passing over the pulleys $R_1$ and $R_2$. One of the pulleys or rollers for instance $R_1$ may be connected directly or by means of a suitable coupling to the adjusting member of the apparatus as for instance to the turning knob of the tuning condenser or it may be connected to the tuning member proper such as for instance through a direct connection with the condenser axis. As indicated the rotor plates 19 of the tuning condenser may be secured directly to the shaft 20 which carries pulley $R_1$ or the rotor plate shaft may be connected with 20 by any desired form of gearing. The distance between the luminous pointers $Z_1$ and $Z_2$ and the diameter of the rollers $R_1$ and $R_2$ are chosen in such manner that by operating the setting device the pointers $Z_1$ and $Z_2$ are so moved that while the pointer $Z_1$ passes from the lower edge of the partial scale A to its upper edge, the pointer $Z_2$ moves from the upper edge of the scale A around an arc up to the upper edge of the scale B. When the cord drive is further operated, the pointer $Z_2$ moves from the upper edge of the scale B to its lower edge, whilst the pointer $Z_1$ thereby passes from the upper edge of the partial scale A up to the upper edge of the partial scale B. As will be seen only one pointer is always visible upon the scale while the other one is covered by the wall G of the casing or panel 15. The slots 22 through which the light passes in the pointers $Z_1$, $Z_2$ remain horizontal while they are passing behind the scales A and B so that the beam of light will correctly overlie the several station letters or names on the scales.

Figure 5 shows a tooth rack driving mechanism for the pointers $Z_1$ and $Z_2$. The racks $T_1$ and $T_2$ on which the pointers $Z_1$ and $Z_2$ are fastened are carried in suitable guides (not shown) and are driven by a gear D. The gear D is either directly or indirectly driven by the tuning knob or setting device. The pointers are arranged upon the racks in such manner that while the pointer $Z_1$ moves from the lower edge of the partial scale A to its upper edge, the pointer $Z_2$, covered and concealed by the wall G of the casing or panel 15 passes to the upper edge of the partial scale B. In continuing the rotation of the gear D, the pointer $Z_2$ moves across the partial scale B whereas the pointer $Z_1$ is covered by the wall of the casing.

In order to avoid a gap in reading the scale it is advisable to have the partial scales somewhat overlapping each other and to arrange accordingly the pointers in such manner, that pointer $Z_2$ already appears upon the scale B when the other pointer $Z_1$ has not yet entirely disappeared from the partial scale A. This result is secured by securing pointer $Z_2$ in the proper vertical position on rack $T_2$.

A further embodiment of the driving mechanism for the pointers is shown in Figures 6 to 8 in three different positions. In this construction the pointers are moved by means of a parallelogram arrangement. This device has the advantage over the above cord or tooth rack driving mechanism respectively in that the space taken up for the guide is smaller, so that this drive can also be used for casings of small height. The parallelogram arrangement consists of two equal rocker arms or levers $W_1$ and $W_2$ mounted on pivot shafts in the center between the scales as at $L_1$ and $L_2$. The one pivoting axis, for instance $L_1$ may at the same time represent the axis of the tuning condenser plates 19, or it may be coupled therewith in a suitable manner. The extremities of corresponding legs of the rock levers $W_1$ and $W_2$ are connected with each other by means of links $M_1$ and $M_2$. The pointers $Z_1$ and $Z_2$ are arranged preferably in the center of the links, each being secured to its respective link. The legs of the levers $W_1$ and $W_2$ form an angle of 90° for instance.

When the above mentioned overlapping of the partial scales is provided, the angle will suitably be chosen somewhat larger for instance 96° in order that the luminous pointers may be simultaneously visible in the region of overlapping.

As will be seen from Figures 6 to 8, the pointers $Z_1$ and $Z_2$ move upon an arc by operating the parallelogram guide by means of the setting device. Due to the rotary motion however of the luminous pointers during their movement, a lateral displacement of same occurs with respect to the linear scale, which can be compensated however in that the scales are disposed in such manner that the lateral deviations of the pointers are distributed at both sides of the scale and that the luminous pointers are chosen long enough so that the scale also during the largest lateral deviation of the pointers, is still illuminated across its entire width. Figure 6 shows the position of the pointers for the initial place, Figure 7 for the central position and Figure 8 for the end position of the tuning element, so that therefore during a rotation of the tuning condenser over 180° the luminous pointers successively pass the entire scale.

Instead of a double division of the scale, a division into several parts may be effected whereby the pointer arrangement, as will be obvious from the above, is constructed correspondingly so that the pointers pass the single partial scales in succession. Also either of the operating means shown in Figs. 4 to 6 may be used to operate the indicators $Z_1$ and $Z_2$ of Figs. 1 and 2. It is preferable to mount the operating means to the rear of panel 15, the tuning condenser shaft passing through an opening therein and having the usual operating knob in front of the panel.

I claim:

1. In combination in a tuning indicator, two adjacently mounted scale, an indicator cooperating to denote positions on said first scale, a second indicator to denote positions on said second scale and a common flexible belt driving means secured to said indicators to move each of said indicators along its respective scale and means for concealing one indicator from view while the other is moving along its scale.

2. In combination in an indicating device, two vertically mounted scales, two indicators cooperating with said scales, and means including a flexible belt carrying said indicators for actuating them to cause one to move from bottom to top of one scale while the other indicator is removed from its scale.

3. In combination in an indicating device, two adjacently mounted scales, a box mounted behind each scale each box having an opening in one end thereof, means for passing a beam of light through said openings and a common operating means for moving each box along the length of its scale.

4. In combination in an indicating device, a panel, a scale comprising a plurality of translucent portions, each of said portions having station indicia inscribed thereon, sources of light mounted behind said scale, means for moving one of said sources of light lengthwise of said scale while maintaining the other source concealed by said panel, and means for confining the light emitted by said sources to substantially the area covered by one of said translucent portions.

5. In combination in a tuning indicator, a scale comprising a plurality of station designating plates, two pulleys spaced apart a distance greater than the length of said scale, a flexible cord passing over said pulleys, and two indicators secured to said cord and so spaced apart that while one indicator is moving along its scale the other indicator is moving about the periphery of one of said pulleys.

6. In combination in a tuning indicator, an elongated scale provided with a plurality of station designating characters, the letters composing each character being in horizontal alignment, an elongated indicator and means for moving said indicator along said scale and retaining it in a horizontal position, said means comprising two rock levers, means for pivotally supporting said levers one above the other and a link connecting corresponding arms of said levers, said elongated indicator being attached to said link.

7. In an indicator for a tuning means, a vertical panel having an opening therein, two scales each being marked with station indicia, an escutcheon plate secured to said panel in front of said opening and arranged to secure said scales in position, a separate indicator cooperating with each of said scales and connected to said tuning means and a belt drive mounted behind said panel and supporting said indicators.

MARTIN ZEH.